(12) United States Patent
Bresciani et al.

(10) Patent No.: US 8,724,104 B2
(45) Date of Patent: May 13, 2014

(54) COARSE AND FINE PROJECTIVE OPTICAL METROLOGY SYSTEM

(75) Inventors: Fulvio Bresciani, Rome (IT); Fabio Musso, Rome (IT)

(73) Assignee: Thales Alenia Space Italia S.p.A. Con Unico Socio, Rome (IT)

( * ) Notice: Subject to any disclaimer, the term of this patent is extended or adjusted under 35 U.S.C. 154(b) by 114 days.

(21) Appl. No.: 13/440,691

(22) Filed: Apr. 5, 2012

(65) Prior Publication Data
US 2012/0261513 A1 Oct. 18, 2012

(30) Foreign Application Priority Data

Apr. 8, 2011 (IT) ................ TO2011A0323

(51) Int. Cl.
*G01B 11/26* (2006.01)
*G01C 1/00* (2006.01)

(52) U.S. Cl.
USPC ............. 356/139.03; 356/3.16; 359/727; 359/629

(58) Field of Classification Search
USPC ............. 359/727, 629; 356/139.03, 3.16
See application file for complete search history.

(56) References Cited

U.S. PATENT DOCUMENTS

| | | | |
|---|---|---|---|
| 4,834,531 A | 5/1989 | Ward | |
| 6,061,188 A * | 5/2000 | Kamon | 359/727 |
| 6,870,975 B1 * | 3/2005 | Morison et al. | 385/12 |
| 7,561,262 B2 * | 7/2009 | Napierala et al. | 356/139.03 |
| 8,083,407 B2 * | 12/2011 | Attina et al. | 378/203 |
| 2005/0213096 A1 * | 9/2005 | Kouris et al. | 356/388 |
| 2006/0155461 A1 * | 7/2006 | Cho | 701/207 |
| 2008/0002191 A1 | 1/2008 | Napierala | |
| 2008/0111985 A1 * | 5/2008 | Bridges | 356/3.16 |
| 2011/0043808 A1 | 2/2011 | Isozaki et al. | |

FOREIGN PATENT DOCUMENTS

FR 2702056 9/1994

OTHER PUBLICATIONS

Italian Search Report dated Nov. 17, 2011.

* cited by examiner

*Primary Examiner* — Isam Alsomiri
*Assistant Examiner* — Samantha K Abraham
(74) *Attorney, Agent, or Firm* — McCarter & English, LLP

(57) ABSTRACT

Described herein is a projective optical metrology system including: a light target formed by a first number of light sources having a pre-set spatial arrangement; and an optical unit including an optoelectronic image sensor, which receives a light signal coming from the light target and defines two different optical paths for the light signal towards the optoelectronic image sensor. The two optical paths are such that the light signal forms on the optoelectronic image sensor at most an image of the light target that can be processed for determining at least one quantity indicating the mutual arrangement between the light target and the optical unit.

11 Claims, 8 Drawing Sheets

COARSE AND FINE PROJECTIVE OPTICAL METROLOGY SYSTEM

The present invention relates to an optical metrology system of a projective type. In particular, the present invention regards a coarse and fine projective optical metrology system.

BACKGROUND OF THE INVENTION

As is known, now available are numerous metrology systems, which find use, amongst other things, in the aerospace sector.

In particular, metrology systems are known having the function of determining the attitude and/or position of a satellite. Even more in particular, metrology systems are known which enable, given a pair of satellites, determination of the mutual position and mutual attitude of the two satellites.

Determination of the attitudes and positions of satellites is of particular importance in the case of satellite systems the satellites of which are arranged in formation, i.e., in the cases where there is envisaged the determination of the attitude and position of each satellite as a function of the attitude and position of the other satellites.

In practice, given two satellites, determination of the mutual attitude and mutual position requires determination of six degrees of freedom. In fact, assuming a first reference system and a second reference system fixed with respect to a first satellite and a second satellite, respectively, and formed, each, by a respective triad of perpendicular axes, the mutual attitude and mutual position of the first and second reference systems, and hence of the first and second satellites, can be expressed in terms of three (linear) displacements and three rotations (angles). In particular, the mutual position of the first satellite with respect to the second satellite can be expressed by means of a set of three displacements measured, respectively, along the three axes of the second reference system. Likewise, the attitude of the first satellite with respect to the second satellite can be expressed by means of a set of three angles, equal to corresponding rotations of the first reference system with respect to the second reference system.

This being said, in general optical metrology systems now available can be divided into so-called "coarse" systems and so-called "fine" systems, according to the accuracy and the field of application, the latter being given by the range of distances that can lie between the satellites without the levels of performance degrading significantly.

In greater detail, fine metrology systems enable determination of the mutual position of two satellites with an accuracy lower than a centimeter, provided that the satellites are not set at a distance apart greater than about fifty meters. Some fine metrology systems even enable determination of the mutual position of two satellites with an accuracy of the order of one tenth of a millimeter, provided that the satellites are not set at a distance apart greater than one meter.

Instead, coarse metrology systems are characterized by an accuracy not lower than about ten centimeters. However, they are able to operate also when the distance between the satellites is greater than fifty meters, for example also up to distances of twenty kilometers.

By way of example, coarse metrology systems comprise metrology systems based upon the use of the satellite global positioning system (GPS), as well as metrology systems based upon the use of radio-frequency radiation, the latter resorting to considerably complex antenna networks.

As regards, instead, fine metrology systems, known to the art are systems of an at least in part projective type, which envisage that, given two satellites, one of them is equipped with a target formed by a number N of light sources, and the other is equipped with an optical unit, which includes an optoelectronic sensor able to acquire an image of the target, on the basis of which, by means of post-processing, the optical unit itself determines one or more of the aforementioned degrees of freedom.

By way of example, the patent application No. EP1986018 describes a system for determining the position and attitude of a system with six degrees of freedom, and where the number N of light sources of the target is equal to one. However, to enable determination of all six degrees of freedom, the system described in the document No. EP1986018 requires the individual light source to be formed by a coherent-light source such as, for example, a laser, and moreover requires that the optical unit will be able to carry out, in addition to processing the images of the target, measurements of the power effectively received by the optoelectronic sensor and an angular measurement of rotation of the polarization of the beam of light emitted by the coherent-light source.

In even greater detail, with reference to a first satellite and a second satellite, and assuming that the target is located on the first satellite, the system described in the document No. EP1986018 envisages that the optical unit on board the second satellite will be equipped with three optoelectronic detectors that are able to detect, each, the power associated to the fraction of electromagnetic radiation emitted by the coherent-light source and effectively impinging upon the optoelectronic detector itself. Consequently, the system described in the document No. EP1986018 is not of a purely projective type.

There are on the other hand known fine metrology systems that do not envisage determination of measurements of power, i.e., metrology systems of a purely projective type. An example of said metrology systems is provided in the document No. U.S. Pat. No. 7,561,262, where the light sources are formed by reflectors designed to be arranged on the first satellite, which are illuminated by radiation emitted by the second satellite. Moreover known are fine metrology systems of a purely projective type, where the target is formed by a particularly large number of light sources (for example, eight).

In addition, stereoscopic-vision systems are known, such as for example the system described in the document No. FR2702056, where two different optical paths are provided, which are characterized by one and the same focal length and are optically connected to one and the same sensitive surface. In this way, for each object, formed on the sensitive surface are two corresponding images, which define a three-dimensional image of the object.

Moreover available are systems designed to determine the shape of the surface of a target. For example, the system described in the document No. US2011/0043808 comprises a device designed to irradiate the target, as well as a display device designed to receive the radiation reflected by the target and to convey it towards a plurality of sensitive surfaces.

Even though fine metrology systems are characterized by a high degree of accuracy, unlike coarse metrology systems, they can operate in an optimal way only if the distances between the satellites are limited, as mentioned previously. Consequently, there is felt the need of having available a metrology system capable of operating both in the case where the distance between the target and the optical unit is limited and in the case where the distance between the target and the optical unit is large. In this connection, the measuring and tracking system described in the document No. US2008/0111985 comprises two optical paths, which share one and the same optical input, but terminate on two different photosensitive surfaces and have different focal lengths. In this way, the measuring and tracking system extends the range of the distances between the target and the optical unit within which the system itself is characterized by a high accuracy.

In practice, since each image is formed by a plurality of corresponding image dots, the measuring and tracking system described in the document No. US2008/0111985 resorts to two different photosensitive surfaces in order to acquire the two different images correctly, i.e., in order to associate each image dot to the respective image, thus enabling a correct processing of the images themselves. In this way, it is not necessary to use processing algorithms or additional hardware designed to determine which of the image dots will belong to a first image and which to a second image. However, the use of two photosensitive surfaces becomes in effect necessary.

SUMMARY OF THE INVENTION

The aim of the present invention is to provide a projective optical metrology system that will solve at least in part the drawbacks of the known art.

According to the invention, a projective optical metrology system is provided as defined in the annexed claims.

BRIEF DESCRIPTION OF THE DRAWINGS

For a better understanding of the invention, embodiments thereof are now described, purely by way of non-limiting example and with reference to the attached drawings, wherein.

DETAILED DESCRIPTION OF THE INVENTION

Figure 1:
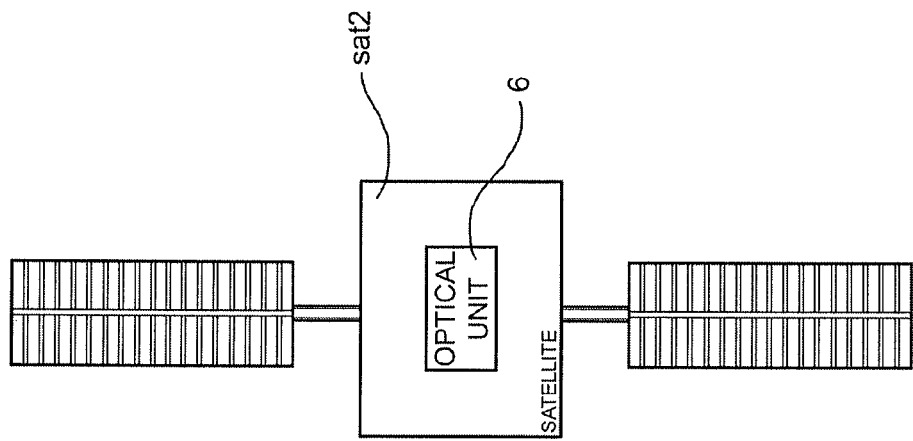
FIGS. 1 and 9 show block diagrams of satellite systems.
Figure 1:
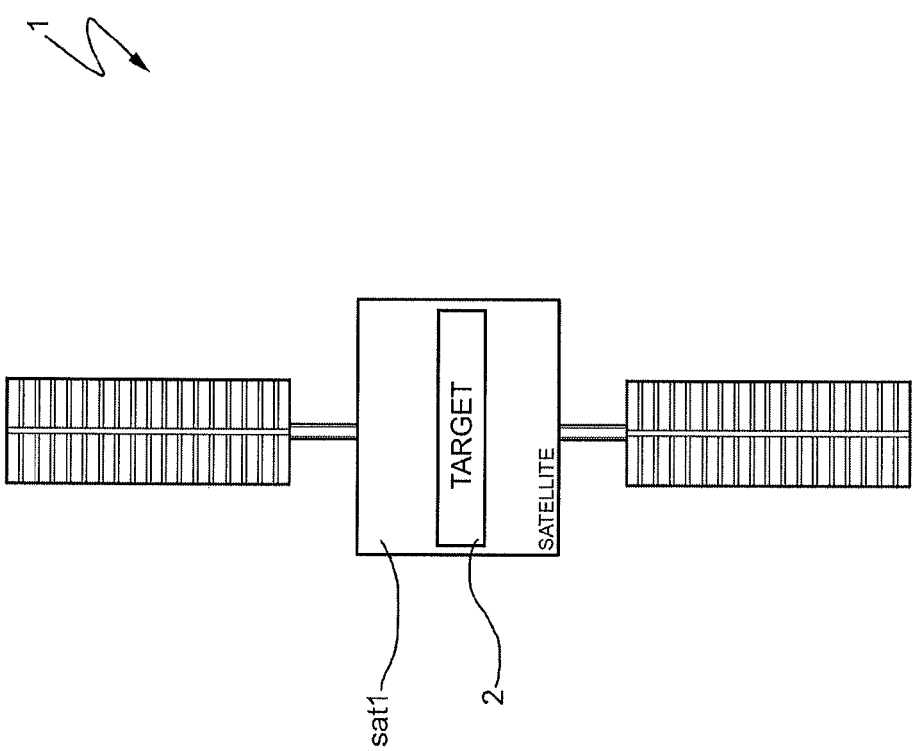

FIG. 1 shows an optical metrology system of a projective type, hereinafter referred to for brevity as "metrology system 1". The metrology system 1 is moreover described in what follows with particular reference to an application of a satellite type, even though it can find use in different spheres of application, as mentioned in the sequel.

In detail, the metrology system 1 comprises a target 2 designed to be constrained to a first satellite sat1 and an optical unit 6 designed to be constrained to a second satellite sat2.

Figure 2:
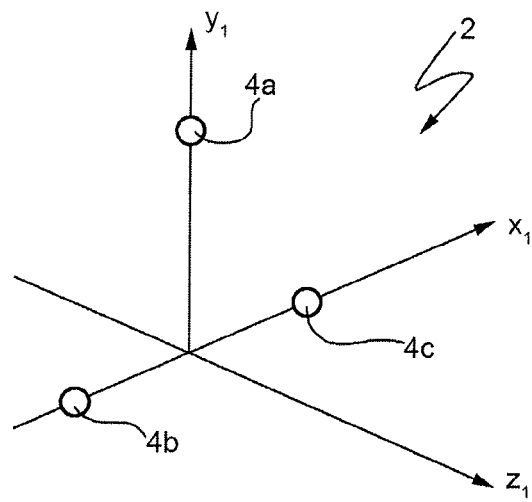
FIG. 2 is a schematic illustration of a light target.

As shown in greater detail in FIG. 2, the target 2 comprises a first light source 4a, a second light source 4b, and a third light source 4c, each formed, for example, by a corresponding light-emitting diode (LED). The first, second, and third light sources 4a-4c are arranged coplanar and at the vertices of a hypothetical triangle, for example an isosceles or equilateral triangle. In particular, on the hypothesis of point-like light sources, assuming a first reference system $x_1, y_1, z_1$ fixed with respect to the first satellite sat1 and formed by three axes $z_1$ orthogonal to one another, and assuming moreover that the axis $z_1$ is perpendicular to the plane in which the first, second, and third light sources 4a-4c lie, and that the second and third light sources 4b-4c lie along the axis $x_1$, it is possible to express the points of the space in which the first, second, and third light sources 4a-4c are located, respectively, as $[0, Y_0, 0]$, $[-X_0, 0, 0]$, and $[X_0, 0, 0]$.

Figure 3:
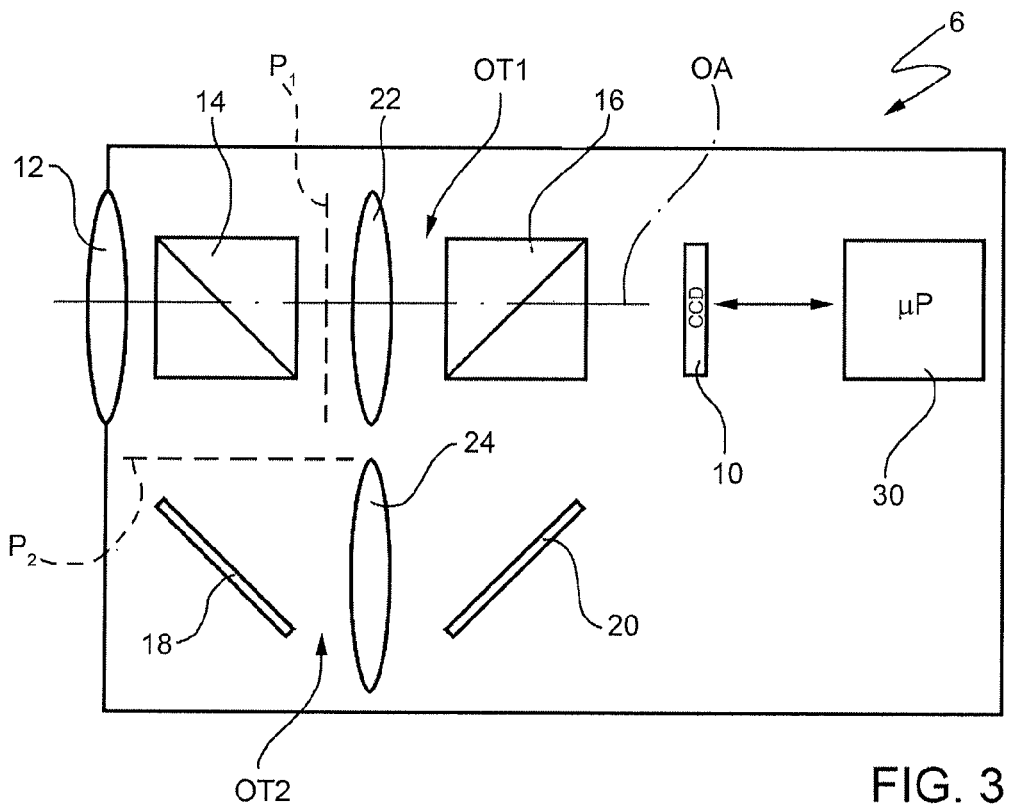
FIG. 3 shows a block diagram of an optical unit according to the present invention.

As shown in FIG. 3, the optical unit 6 comprises an optoelectronic sensor 10, an input lens 12 designed to receive the optical rays generated by the target 2, a first optical beam splitter 14 and a second optical beam splitter 16, a first reflecting element 18 and a second reflecting element 20, and a first intermediate lens 22 and a second intermediate lens 24. Purely by way of example, the input lens 12 and the first and second intermediate lenses 22, 24 may be concave.

The optical unit 6 further comprises an electronic processing unit 30, which is electrically connected to the optoelectronic sensor 10.

In greater detail, the input lens 12, the first optical beam splitter 14, the first intermediate lens 22, the second optical beam splitter 16, and the optoelectronic sensor 10 are arranged in succession and optically aligned. In other words, the first optical beam splitter 14 is arranged between the input lens 12 and the first intermediate lens 22, which in turn is arranged between the first and second optical beam splitters 14, 16. Finally, the second optical beam splitter 16 is arranged between the first intermediate lens 22 and the optoelectronic sensor 10.

The optical axes of the input lens 12 and of the first intermediate lens 22 are approximately coincident and pass substantially through the centre of the optoelectronic sensor 10. By way of example, in FIG. 3 the (coincident) optical axes of the input lens 12 and of the first intermediate lens 22 are designated by OA; for simplicity, in what follows, they will be referred to as "system axis OA".

For simplicity of description, and without any loss of generality, in what follows it is assumed that the input lens 12 and the first and second intermediate lenses 22, 24 are thin. This being said, the input lens 12, the first optical beam splitter 14, the first intermediate lens 22, and the second optical beam splitter 16 form a first optical circuit, which will be referred to hereinafter as "first optical train OT1".

From an optical standpoint, the first optical train OT1 has a first rear principal plane $P_1$ and a first rear effective focal length $f_1$, referred to hereinafter for brevity respectively as "first principal plane $P_1$" and "first focal length $f_1$". Purely by way of example, in FIG. 3 the first principal plane $P_1$ is arranged between the first optical beam splitter 14 and the first intermediate lens 22.

The position of the first principal plane $P_1$ and the first focal length $f_1$ can be determined in a way in itself known and depend upon the focal length of the input lens 12, the focal length of the first intermediate lens 22, and the distance between them.

As regards, instead, the second intermediate lens 24, it is arranged between the first and second reflecting elements 18, 20, in such a way that the input lens 12, the first optical beam splitter 14, the first reflecting element 18, the second intermediate lens 24, the second reflecting element 20, and the second optical beam splitter 16 form a second optical circuit, which will be referred to hereinafter as "second optical train OT2".

From an optical standpoint, the second optical train OT2 has a second rear principal plane $P_2$ and a second rear effective focal length $f_2$, referred to hereinafter for brevity respectively as "second principal plane $P_2$" and "second focal length $f_2$". Purely by way of example, in FIG. 3 the second principal plane $P_2$ is arranged between the first optical beam splitter 14 and the first reflecting element 18.

The position of the second principal plane $P_2$ and the second focal length $f_2$ can be determined in a way in itself known and depend upon the focal length of the input lens 12, the focal length of the second intermediate lens 24, and the distance between them.

In detail, the second focal length $f_2$ is greater than the first focal length $f_1$. In this connection, in order to obtain $f_2 > f_1$, it is sufficient for the second intermediate lens 24 to have a focal length greater than the focal length of the first intermediate lens 22.

Figure 4:
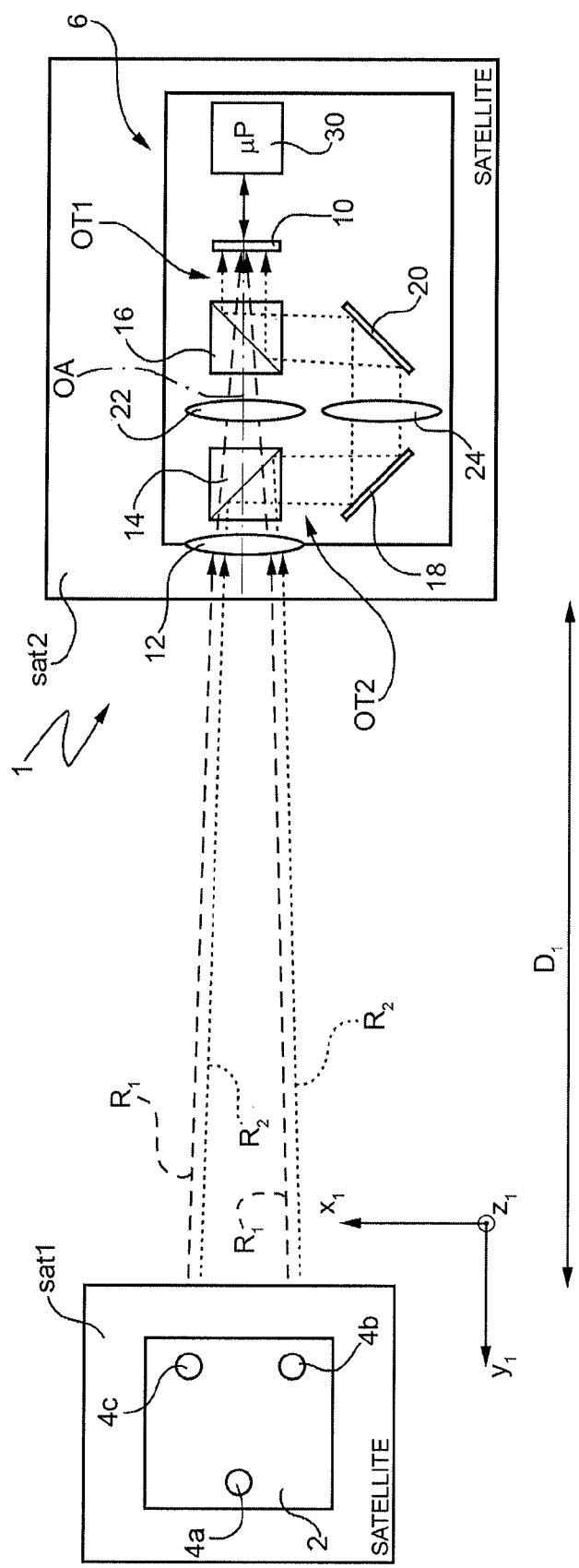
FIGS. 4 and 6 show block diagrams of an optical metrology system using the optical unit shown in FIG. 3.

Operatively, if the optical rays generated by the target 2 and received by the input lens 12 are referred to as "overall optical rays", a first fraction of the overall optical rays is focused by the first optical train OT1 on the optoelectronic sensor 10, along the system axis OA, i.e., after traversing the first optical beam splitter 14, the first intermediate lens 22, and the second optical beam splitter 16. The first fraction of the overall optical rays, which will be referred to hereinafter as "first optical beam", is shown in FIG. 4 in a purely qualitative way, where it is designated by $R_1$. In practice, the first optical beam $R_1$ comprises the optical rays that traverse, in addition to the input lens 12 and the first intermediate lens 22, also the first and second optical beam splitters 14, 16, without being reflected thereby.

The first optical train OT1 hence defines a first optical path, arranged between the input lens 12 and the optoelectronic sensor 10 and having a first length $l_1$, understood as the distance that the optical rays of the aforesaid first optical beam $R_1$ cover to reach, starting from the input lens 12, the optoelectronic sensor 10.

As regards, instead, the second optical train OT2, the first reflecting element 18 is arranged so as to receive a second fraction of overall optical rays, comprising, in the case in point, the portion of overall optical rays that, after traversing the input lens 12, are reflected by the first optical beam splitter 14. The second fraction of overall optical rays, which will be referred to hereinafter as "second optical beam", is shown in FIG. 4 in a purely qualitative way, where it is designated by $R_2$. In practice, the first optical beam splitter 14 operates so as to separate the first and second optical beams $R_1$, $R_2$.

The first reflecting element 18, the second intermediate lens 24, and the second reflecting element 20 are moreover arranged in such a way that the second optical beam $R_2$ is reflected by the first reflecting element 18 in the direction of the second intermediate lens 24. After traversing the second intermediate lens 24, the second optical beam $R_2$ is received by the second reflecting element 20, which reflects it in the direction of the second optical beam splitter 16. Finally, the second optical beam splitter 16 reflects the second optical beam $R_2$ in the direction of the optoelectronic sensor 10, once again along the system axis OA. In practice, the second optical beam splitter 16 operates so as to recombine the first and second optical beams $R_1$, $R_2$.

Operatively, the second optical train OT2 is able to direct the second optical beam $R_2$ towards the optoelectronic sensor 10. The second optical train OT2 hence defines a second optical path, arranged between the input lens 12 and the optoelectronic sensor 10 and having a second length $l_2$, greater than the first length $l_1$ and understood as the distance that the optical rays of the aforementioned second optical beam $R_2$ cover to reach, starting from the input lens 12, the optoelectronic sensor 10.

The second optical path does not traverse the first intermediate lens 22, and moreover shares with the first optical path one and the same input point, defined by the input lens 12, and one and the same end point, defined by the optoelectronic sensor 10.

Once again with reference to FIG. 3, the first and second principal planes $P_1$, $P_2$ are set apart from the first optoelectronic sensor 10, respectively, by a first distance $d_1$ and a second distance $d_2$, measured along the first and second optical paths, respectively. In other words, neglecting the inclination of the optical rays with respect to the system axis OA, the first optical beam $R_1$ propagates, to reach the optoelectronic sensor 10 starting from the first principal plane $P_1$, over a distance equal to $d_1$. Likewise, the second optical beam $R_2$ propagates, to reach the optoelectronic sensor starting from the second principal plane $P_2$, over a distance equal to $d_2$.

Figure 5:
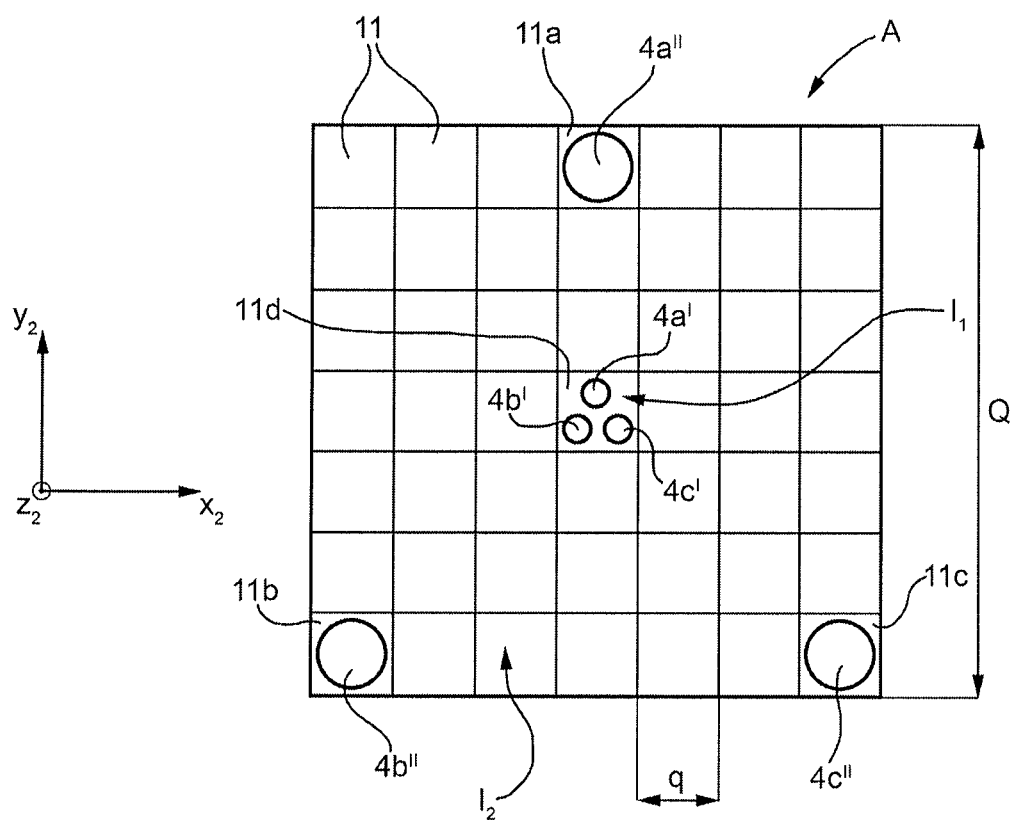
FIGS. 5 and 7 are qualitative front views of a detection surface of an optoelectronic sensor of the optical unit shown in FIG. 3.

As shown in FIG. 5, the optoelectronic sensor 10 can be formed, for example, by a charge-coupling device (CCD), and has a detection surface A having, for example, a square shape. The detection surface A is formed by an array of M image elements generally known as pixels 11 and is arranged, as mentioned previously, in a direction perpendicular to the system axis OA, i.e., in a direction perpendicular to the optical axes of the input lens 12 and of the first intermediate lens 22. Moreover, the geometrical centre of the detection surface A preferably lies along the system axis OA. In practice, the optoelectronic sensor 10 is a so-called image sensor.

This being said, preferably the aforementioned first and second distances $d_1$, $d_2$ are substantially equal, respectively, to the first and second focal lengths $f_1$ and $f_2$. Consequently, given a hypothetical light source arranged at an infinite distance from the second satellite sat2, the corresponding first and second optical beams $R_1$, $R_2$ are focused substantially in a single point of the detection surface A of the optoelectronic sensor 10.

As regards, instead, the target 2, set inevitably at a non-infinite distance from the second satellite sat2, at the optoelectronic sensor 10 a first image and a second image of the target 2 are formed.

In greater detail, as shown qualitatively once again in FIG. 4, the first and second focal lengths $f_1$ and $f_2$ are such that, when the first satellite sat1, and hence the target 2, are at the distance $D_1$ (with $D_1 \gg f_2$) from the second satellite sat2, the first optical beam $R_1$ impinges effectively on the detection surface A of the optoelectronic sensor 10, there concurring in determining a first distribution of M light intensities, as detected by the M pixels 11 of the optoelectronic sensor 10.

In practice, as shown in FIG. 5, the first optical beam $R_1$ forms on the detection surface A of the optoelectronic sensor 10 a first image $I_1$ of the target 2, formed by a first image dot $4a'$, a second image dot $4b'$, and a third image dot $4c'$ corresponding, respectively, to the first, second, and third light sources $4a$-$4c$.

Also the second optical beam $R_2$ impinges upon the detection surface A of the optoelectronic sensor 10 and concurs, hence, to forming the first distribution of M light intensities. In particular, the second optical beam $R_2$ forms on the detection surface A of the optoelectronic sensor 10 a second image $I_2$ of the target 2, formed by a fourth image dot $4a''$, a fifth image dot $4b''$, and a sixth image dot $4c''$, corresponding, respectively, to the first, second, and third light sources $4a$-$4c$. It should be noted that, for simplicity of exposition, in FIG. 5 it is assumed that each image dot excites a single pixel, even though typically each image dot excites a number of pixels greater than one.

On the basis of the first distribution of M light intensities, the electronic processing unit 30 is able to determine a first pixel, a second pixel, and a third pixel designated by $11a$, $11b$, and $11c$, respectively, which correspond to the fourth, fifth, and sixth image dots $4a''$-$4c''$, respectively.

For example, the electronic processing unit 30 can identify the first, second, and third pixels $11a$-$11c$ by means of a search for the relative maxima between the M light intensities of the first distribution of M light intensities. In this case, in a way in itself known, the first, second, and third pixels 11a-11c are characterized in that, considering any one of them, the light intensity detected thereby is greater than the light intensities detected by the pixels surrounding it In other words, the fourth, fifth, and sixth image dots 4a''-4c'' can be identified electronically as distinct from one another, and in particular as corresponding to three different pixels. This means that the second image $I_2$ is clear; namely, it can be processed electronically by the electronic processing unit 30 in such a way as to identify, in a way in itself known, a number of relative maxima of light intensity equal to the number of light sources present in the target 2 (in the case in point, three), said relative maxima of light intensity corresponding to the fourth, fifth, and sixth image dots 4a''-4c''.

Instead, the first, second, and third image dots 4a'-4c' excite just one pixel, in the case in point a fourth pixel designated by 11d. Consequently, they cannot be identified electronically as distinct from one another. In other words, the first image $I_1$ of the target 2 is not clear.

In practice, the fact that a generic image formed on the detection surface A of the optoelectronic sensor 10 is clear depends, in a way in itself known, upon the dimensions of the target 2, the distance of the target 2 from the second satellite sat2, the focal length of the corresponding optical train that has generated it, as well as the area of the detection surface A of the optoelectronic sensor 10. In this connection, in what follows, it will be assumed, without this implying any loss of generality, that the detection surface A has a square shape of side Q, and that each pixel 11 has a square shape of side q.

Moreover, strictly speaking, the fact that a generic image is clear or otherwise depends upon the (known) processing techniques adopted by the electronic processing unit 30 to process the distribution of M light intensities detected by the M pixels 11. In fact, even though it is possible, as described previously, that the electronic processing unit 30 determines the relative maxima of light intensity directly on the basis of the light intensities detected by the pixels 11, it is moreover possible that the determination of the relative maxima is carried out by means of the so-called centroid method, or similar methods. In particular, the centroid method, described for example in "Error analysis of CCD-based point source centroid computation under the background light", by Xiaoyu Ma, Changhui Rao and Hanging Zheng, OPTICS EXPRESS Vol. 17, No. 10 and in "Improved Iteration Centroid Algorithm Based on Linear CCD Light-spot Location", Shengjin Tang, Zhaofa Zhou, Xiaosong Guo, Yongchao Xiao, The Ninth International Conference on Electronic Measurement & Instruments, ICEMI 2009, envisages interpolation of the light intensities detected by the pixels 11, in themselves discretized in space, in order to determine space-continuous interpolating curves (for example, Gaussian curves), on the basis of which the relative maxima are determined.

It should be noted that, in the case where the electronic processing unit 30 determines the relative maxima of light intensity merely on the basis of the light intensities detected by the pixels 11, without operations of interpolation, a generic image is clear if the electronic processing unit 30 is able to identify, for each image dot of the generic image, a corresponding pixel that exhibits a relative maximum of light intensity. If this occurs, the electronic processing unit 30 associates the image dots of the generic image to the co-ordinates of the corresponding pixels. For example, in the case of the fourth, fifth, and sixth image dots 4a''-4c'', they are, respectively, associated to the co-ordinates (described hereinafter) of the first, second, and third pixels 11a-11c.

Consequently, the maximum discretization that it is possible to achieve in determining the position, within the detection surface A, of possible image dots is equal to the side q of a single pixel.

Instead, by adopting known interpolation techniques, such as for example the centroid method, it is possible to obtain a spatial discretization lower than q, i.e., it is possible to associate to the image dots co-ordinates having a discretization lower than q. In fact, for an image to be clear it is sufficient for the electronic processing unit 30 to be able to identify, on the basis of the M light intensities detected by the pixels 11 and in a way in itself known, a number of relative maxima of light intensity equal to the number of light sources present in the target 2, irrespective of whether, on the basis of the light intensities detected by the pixels and of the search alone for the relative maxima between said light intensities, it is possible to identify a number of pixels corresponding to the number of light sources present in the target. For example, the identification of a number of pixels corresponding to the number of light sources present in the target 2 can be prevented by the fact that said search supplies a number of relative maxima lower or higher than the number of light sources.

For simplicity of description, in what follows it will be assumed, except where otherwise specified, that the electronic processing unit 30 determines the relative maxima of light intensity merely on the basis of the search for the relative maxima between the light intensities detected by the pixels 11, without operations of interpolation, and hence that the fourth, fifth, and sixth image dots 4a''-4c'' are associated, respectively, to the co-ordinates of the first, second, and third pixels 11a-11c.

Once again with reference to the first and second images and $I_2$ shown in FIG. 5, the electronic processing unit 30 filters electronically, in a way in itself known, the pixels corresponding to the first image $I_1$, in the case in point the fourth pixel 11d. In practice, the electronic processing unit 30 does not consider the fourth pixel 11d for the processing operations described hereinafter. These filtering operations can be carried out before or after identifying the first, second, and third pixels 11a-11c. In other words, the electronic processing unit 30 selects the second image $I_2$.

Next, the electronic processing unit 30 calculates the mutual position of the first and second satellites sat1 and sat2 on the basis of the second image $I_2$, and in particular, on the basis of the co-ordinates of the first, second, and third pixels 11a-11c.

In this connection, assuming a second reference system $x_2$, $y_2$, $z_2$ formed by three axes $x_2$, $y_2$, $z_2$ (FIG. 5) orthogonal to one another, fixed with respect to the second satellite sat2 and such that the detection surface A of the optoelectronic sensor 10 lies in the plane defined by the axes $x_2$ and $y_2$, the co-ordinates of each of the first, second, and third pixels 11a-11c can be expressed as triads, respectively, of the type $[X_{2a}, y_{2a}, 0]$, $[X_{2b}, y_{2b}, 0]$ and $[X_{2c}, y_{2c}, 0]$.

This being said, in a way in itself known, the electronic processing unit 30 determines by means of known algorithms, and on the basis of the (known) shape of the target 2 and of the triads $[X_{2a}, y_{2a}, 0]$, $[X_{2b}, y_{2b}, 0]$, $[X_{2c}, y_{2c}, 0]$, a triad of mutual displacements $[\Delta x, \Delta y, \Delta z]$ between the first and second satellites sat1 and sat2. Purely by way of example, in order to determine the triad of displacements $[\Delta x, \Delta y, \Delta z]$, the electronic processing unit 30 can use algorithms in themselves known in the field of projective metrology. In this connection, it should be noted that, in general, according to the number of light sources and according to the algorithm used, the electronic processing unit 30 is able to determine only some between the displacements of the triad of displacements [Δx, Δy, Δz], or else may be able to determine further degrees of freedom. For example, in the case where the number of light sources of the target 2 is in effect equal to three, it is possible to determine also a rotation of the target 2 with respect to the axis $z_1$, the latter information regarding the mutual attitude of the first and second satellites sat1 and sat2. Alternatively, and once again by way of example, in the case where the number of light sources is equal to two, it is possible to determine the displacements Δx, Δy, in the absence of rotations of the target 2 about the axes of the reference system $x_1$, $y_1$, $z_1$.

Figure 6:
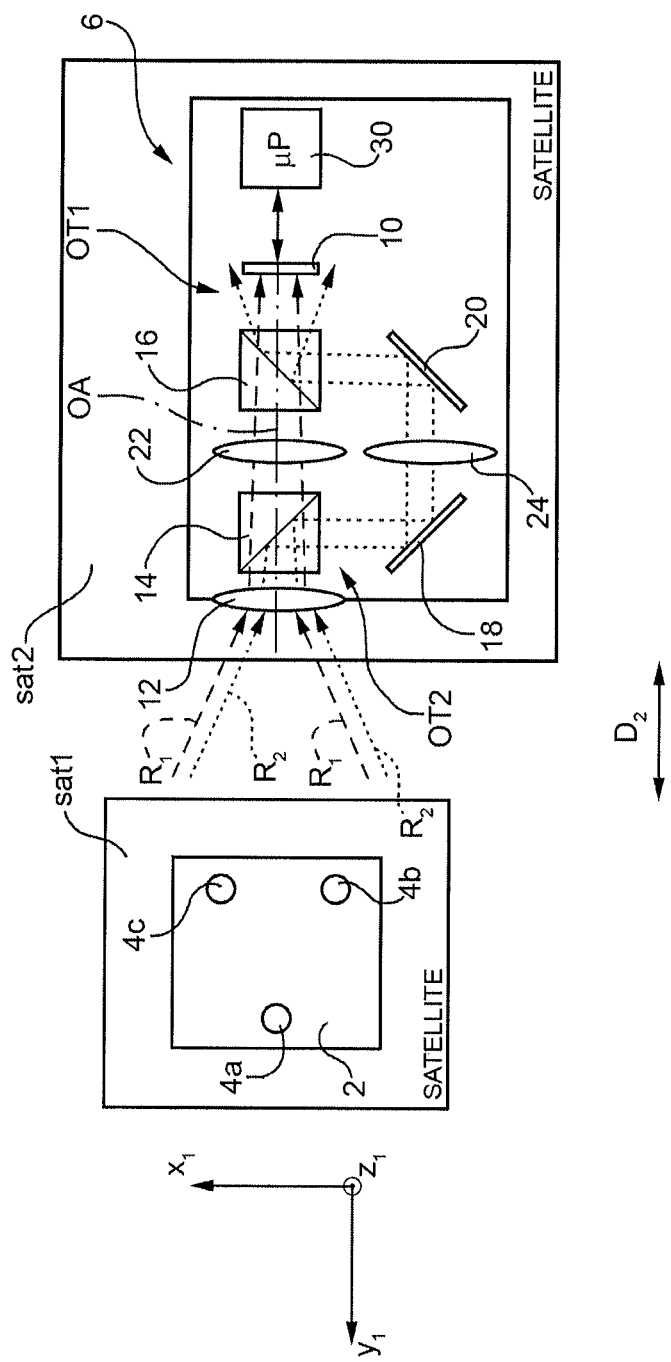

As illustrated in FIG. 6, the first and second focal lengths $f_1$ and $f_2$ are moreover such that, when the first and second satellites sat1, sat2 are at a distance $D_2$ (with $D_2 < D_1$), the second optical beam $R_2$ does not impinge effectively on the optoelectronic sensor 10, but rather is directed outside the detection surface A, whereas just the first optical beam $R_1$ impinges upon the detection surface A, here forming a second distribution of M light intensities, as detected by the M pixels 11 of the optoelectronic sensor 10.

Figure 7:
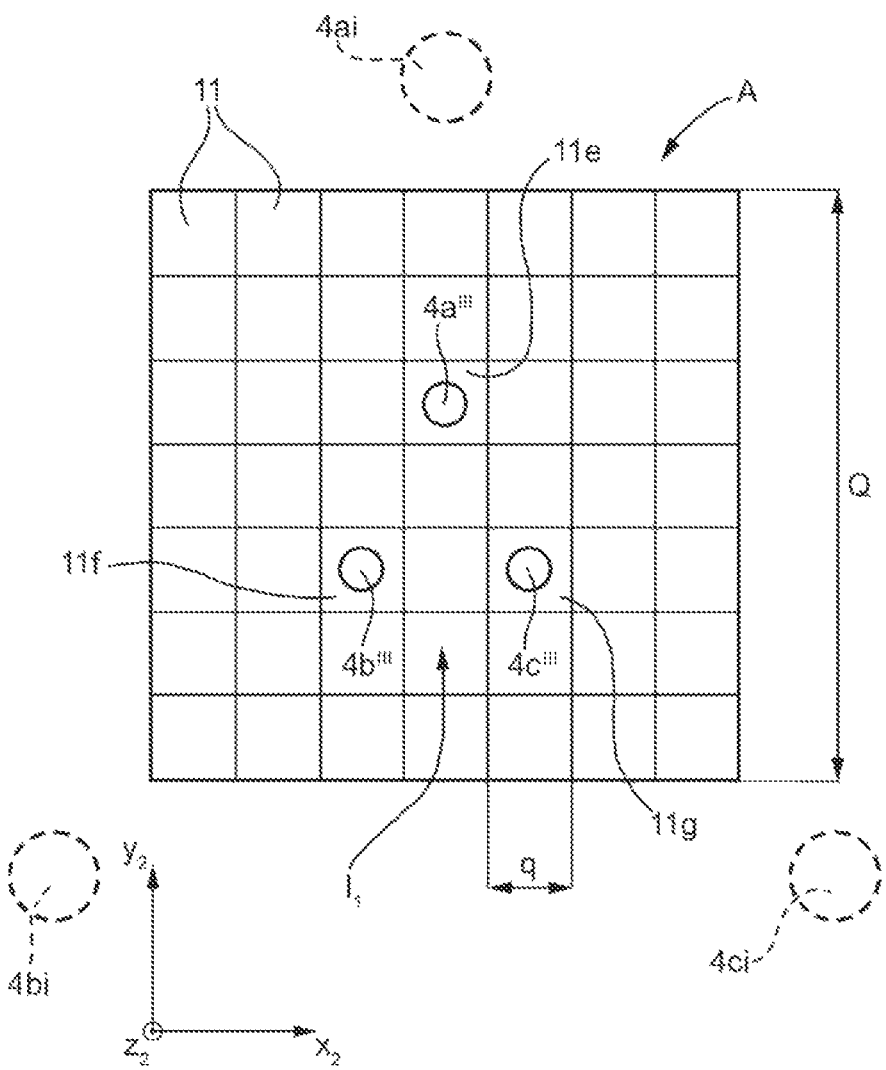

In practice, as shown in FIG. 7, the second optical beam $R_2$ would form a corresponding image only in the case where, instead of the detection surface A of the optoelectronic sensor 10, there was a surface of dimensions greater than the detection surface A. in this case, there would be formed three corresponding image dots, designated in FIG. 7 by 4ai, 4bi and 4ci.

Instead, the first optical beam $R_1$ continues to form on the detection surface A of the optoelectronic sensor 10 the first image $I_1$ of the target 2, which is clear. In fact, the first image $I_1$ is formed by a seventh image dot 4a''', an eighth image dot 4b''', and a ninth image dot 4c''', which are set at a distance to such a degree as to enable the electronic processing unit 30 to identify a fifth pixel 11e, a sixth pixel 11f, and a seventh pixel 11g, via search for the relative maxima between the M light intensities detected by the pixels 11.

In a way similar to what has been discussed previously, the electronic processing unit 30 is thus able to determine, on the basis of the triads [$X_{3a}$, $y_{3a}$, 0], [$X_{3b}$, $y_{3b}$, 0], and [$X_{3c}$, $y_{3c}$, 0] that indicate the co-ordinates of the fifth, sixth, and seventh pixels 11e-11g, a new triad of mutual displacements [Δx, Δy, Δz] between the first and second satellites sat1 and sat2. As regards the possibility of determining, by the electronic processing unit 30, only some of the displacements of the triad of displacements [Δx, Δy, Δz], or else further quantities, the considerations referred to previously apply. In what follows it is assumed, for simplicity, that the electronic processing unit 30 will determine the entire triad of displacements [Δx, Δy, Δz].

In practice, thanks to the presence of the first and second optical trains OT1 and OT2, having different focal lengths, the electronic processing unit 30 is able to determine the mutual displacements between the first and second satellites sat1 and sat2 both at the distance $D_1$ and at the distance $D_2$, which can be very different from one another. For example, the distance $D_1$ may be 2 km, whilst the distance $D_2$ may be 20 m. Consequently, the metrology system 1 can operate in a very wide range of distances between the first and second satellites sat1 and sat2. Moreover, the metrology system 1 can be sized as a function of a desired range of distances between the first and second satellites sat1 and sat2 after prior knowledge of the dimensions of the target.

In detail, in order to enable the metrology system 1 to operate for distances comprised between a maximum distance $D_{max}$ and a minimum distance $D_{min}$, it is possible to determine the first and second focal lengths $f_1$, $f_2$ as described hereinafter. In this connection, it is assumed that, given any distance between the first and second satellites sat1 and sat2, the first and second optical trains OT1 and OT2 produce, in a hypothetical plane of infinite extension and containing the detection surface A, two different images of the target 2. In particular, the image produced by the second optical train OT2 has dimensions greater than the one produced by the first optical train OT1 because the second focal length $f_2$ is greater than the first focal length $f_1$ and hence the second optical train OT2 is characterized, as compared to the first optical train OT1, by a greater enlargement.

This being said, it is possible to determine the second focal length $f_2$ so that, when the target 2 is at the maximum distance $D_{max}$ from the optical unit 6, the corresponding image supplied by the second optical train OT2 is clear. Assuming, for simplicity of calculation, that the target is formed by just two light sources set at a distance O apart, said condition is met if the image supplied by the second optical train OT2 occupies at least two pixels of the optoelectronic sensor 10. For this purpose, we may impose $f_2 = (D_{max} \cdot H_q)/O$, where $H_q$ is equal to 2·q (q being the length of the side of a pixel).

Likewise, it is possible to determine the first focal length $f_1$ so that, when the target 2 is at the minimum distance $D_{min}$ from the optical unit 6, the corresponding image supplied by the first optical train OT1, in addition to being clear, is exactly contained within the detection surface A. Assuming once again, for simplicity of calculation, that the target is formed by just two light sources set at a distance O apart, we can thus impose $f_1 = (D_{min} \cdot Q)/O$, where Q is the length of the side of the detection surface A. For example, assuming $D_{min} = 20$ m and Q=12.79 mm, and assuming that the target subtends at the distance $D_{min}$ an angle of ±4°, to which there corresponds O=2.797 m, we have $f_1$=91.45 mm.

It should be noted that, strictly speaking, the maximum distance $D_{max}$ is the distance between the target 2 and the second principal plane $P_2$, whilst the minimum distance $D_{min}$ is the distance between the target 2 and the first principal plane $P_1$. For simplicity of description, however, generic reference is made to the distance between the target 2 and the optical unit 6.

Figure 8:
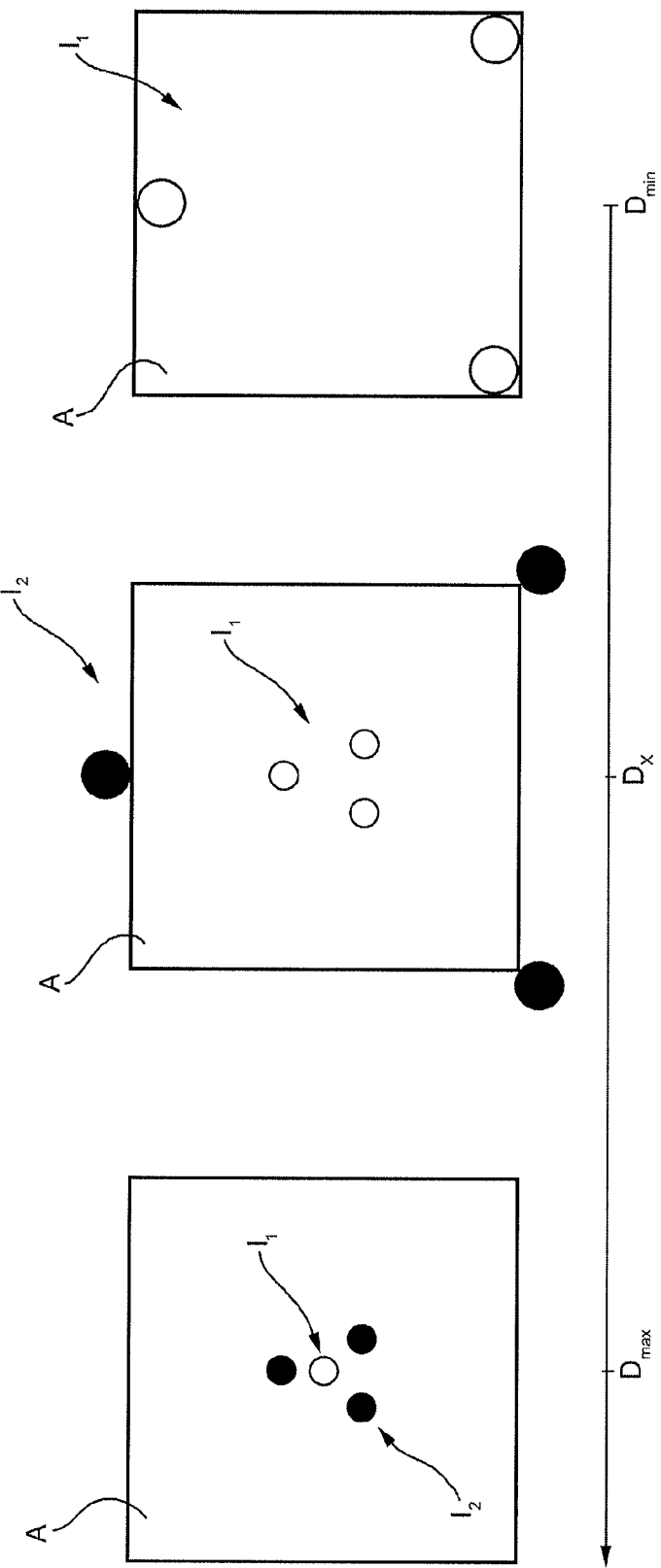
FIG. 8 shows qualitatively the formation of images on the detection surface of the optoelectronic sensor of the optical unit shown in FIG. 3.

As shown qualitatively in FIG. 8, the first and second focal lengths $f_1$ and $f_2$, the target 2, and the detection surface A are moreover such that, designating by $D_x$ the maximum distance between the first and second satellites sat1 and sat2 such that the first image $I_1$ is clear, at this distance $D_x$ it is moreover found that the second optical beam $R_2$ is projected immediately outside the detection surface A. In other words, at the distance $D_x$, it is found that the second optical beam $R_2$ forms, in a hypothetical plane containing the detection surface A, an image external to this detection surface A, the image dots of which are tangential to the edges of the detection surface A. In yet other words, the optical rays of the second optical beam $R_2$ are externally tangential to the detection surface A.

In this way, at any distance, on the detection surface A there is formed at the most just one clear image of the target 2, i.e., just one image is formed that can be processed electronically by the electronic processing unit 30 so as to identify the corresponding maxima of intensity and, hence, so as to enable determination of the triad of displacements [Δx, Δy, Δz]. In fact, as shown qualitatively in FIG. 8, if the distance between the first and second satellites sat1 and sat2 is comprised between $D_{max}$ and $D_x$, on the detection surface A the only clear image is the second image $I_2$, formed by the second optical beam $R_2$. Instead, if the distance between the first and second satellites sat1 and sat2 is comprised between $D_x$ and $D_{min}$, the only clear image is the first image $I_1$, formed by the first optical beam $R_1$. In other words, if [$D_{max}$, $d_x$] is the interval of distances such that the second image $I_2$ is clear, and if $[D_x, d_{min}]$ is the interval of distances such that the first image $I_1$ is clear, the intervals $[D_{max}, d_x]$ and $[D_x, d_{min}]$ are contiguous; it may moreover be noted that the interval $[D_{max}, d_x]$ is expressed mathematically so as to highlight the fact that it is a right-open interval. Embodiments are in any case possible in which the interval $[D_{max}, d_x]$ is closed and the interval $[D_x, d_{min}]$ is a left-open interval, as well as embodiments in which the intervals are separate.

In this way, the operations that the electronic processing unit 30 performs in order to identify the relative maxima of light intensity and to determine the corresponding co-ordinates, on the basis of which it calculates the triad of displacements [Δx, Δy, Δz], are simplified, given that it is not necessary to make the selection of a single image. In fact, if this were not so, i.e., if the first and second focal lengths $f_1$ and $f_2$, the target 2, and the detection surface A were such that there exist distances between the first and second satellites sat1 and sat2 such that, on the detection surface A, two clear images of the target 2 are formed simultaneously, the electronic processing unit 30 would have to select each time a single image on which to carry out subsequently the operations for determining the triad of displacements [Δx, Δy, Δz]. For this purpose, the electronic processing unit 30 would have to determine which image dots belong to the first image $I_1$ and which to the second image $I_2$.

Further embodiments are on the other hand possible, in which the optical unit 6 is provided with further optical trains, having focal lengths different from the first and second focal lengths $f_1$ and $f_2$ in order to increase further the amplitude of the range of distances in which the metrology system 1 may be used.

Figure 9:
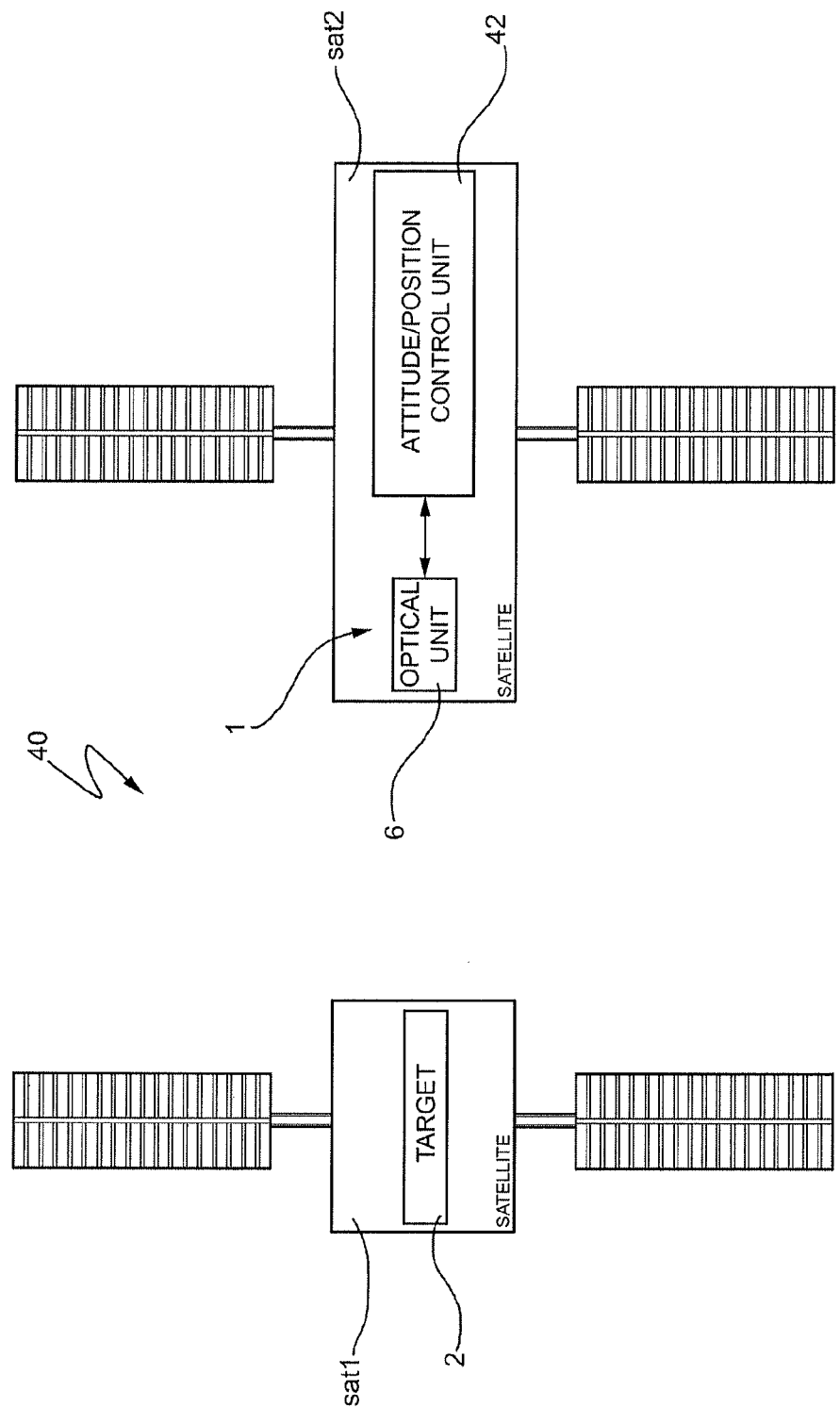

As shown in FIG. 9, the present metrology system can hence be used within a satellite system 40, including the first and second satellites sat1, sat2, and where the second satellite sat2 houses a system for controlling attitude and/or position 42, electronically coupled to the electronic processing unit 30. The attitude and/or position control system 42 can hence receive the triads of displacements [Δx, Δy, Δz] and/or further degrees of freedom that, in time, are determined by the electronic processing unit 30 by iterating the operations described previously. The attitude and/or position control system 42 can thus operate, in a way in itself known, on the basis of the triads of displacements [Δx, Δy, Δz] and/or of further degrees of freedom provided by the electronic processing unit 30.

The advantages that the present projective optical metrology system affords emerge clearly from the foregoing description. Furthermore, the present projective optical metrology system enables determination of the mutual position between two satellites in a particularly wide range of distances, which extends from distances of the order of a few tens of meters up to distances of the order of several kilometers. Said advantages are obtained without using mobile parts or setting up different optical units having different focal lengths, each with a respective optoelectronic sensor. In fact, the optical unit 6 has a single optoelectronic sensor, with evident advantages in terms of reduction of costs and of the complexity of construction.

Moreover, since both the first optical path and the second optical path start in one and the same point, i.e., in a position corresponding to the input lens 12, phenomena of stereoscopic vision are not created.

Finally, it is evident that modifications and variations may be made to the metrology system 1 described herein, without thereby departing from the scope of the present invention.

The input lens 12 and the first and second intermediate lenses can be of a type different from what has been described. Moreover, instead of the first and second intermediate lenses 22, 24 there may be present corresponding optical units formed by numerous lenses, which enable improvement, in a way in itself known, of the quality of the images, given that they are less subject to phenomena such as chromatic aberration. Likewise, the input lens 12 can be replaced by a corresponding optical unit of greater complexity, or else can be replaced by an input lens. In the latter case, the first and second principal planes $P_1$, $P_2$ fall, respectively, within the first and second intermediate lenses 22, 24, and moreover the first and second focal lengths $f_1$, $f_2$ coincide with the focal lengths of the first and second intermediate lenses 22, 24. Likewise, the first and second optical beam splitters 14, 16 may be formed by corresponding prisms, or else may be of any known type.

In addition, the light sources may be different from what has been described. For example, the light sources may be passive, each comprising a mirror, for example of the so-called "corner cube" type. In this case, the optical unit 6 further comprises an illuminator (not shown) designed to illuminate the target in such a way that the mirrors that form the light sources reflect radiation towards the optical unit 6 itself.

Finally, as mentioned previously, the optical unit 6 and the metrology system 1 can find application in sectors other than the aerospace sector. For example, the target 2 can be mounted on a first object, whilst the optical unit 6 can be mounted on a second object, the first and second objects being mechanically coupled in such a way that the metrology system enables determination of the mutual positioning of the first and second objects. For example, said first and second objects may be two different elements of a telescope, mechanically connected together.

The invention claimed is:

1. A projective optical metrology system comprising:
a light target formed by a first number of light sources having a pre-set spatial arrangement; and
an optical unit comprising an optoelectronic image sensor and configured to receive a light signal coming from said light target and to define two different optical paths for the light signal towards said optoelectronic image sensor; and
an electronic processing unit coupled to the optoelectronic image sensor;
characterized in that the two optical paths are such that the light signal forms on the optoelectronic image sensor at most one image of the light target, which can be processed by the electronic processing unit to determine a number of maxima of light intensity equal to said first number of light sources, said electronic processing unit being configured to determine at least one quantity indicating the mutual arrangement of the light target and of the optical unit.

2. The projective optical metrology system according to claim 1, wherein the optoelectronic image sensor comprises a detection surface, and wherein the two optical paths, the light target and the detection surface are such that:
when the light target is set, from the optical unit, at a distance comprised in a first interval of distances, the light signal forms on the detection surface, through a first optical path of said two optical paths, a first image, on the of basis of which the electronic processing unit is able to determine a number of maxima of light intensity equal to said first number of light sources;
when the light target is set, from the optical unit, of a distance that falls outside said first interval of distances, the light signal alternatively does not form, through said first optical path, any image on the detection surface, or else forms an image on the basis of which the electronic processing unit is not able to determine a number of maxima of light intensity equal to said first number of light sources;

when the light target is set, from the optical unit, at a distance comprised in a second interval of distances, the light signal forms on the detection surface, through a second optical path of said two optical paths, a second image, on the basis of which the electronic processing unit is able to determine a number of maxima of light intensity equal to said first number of light sources; and when the light target is set, from the optical unit, at a distance that falls outside said second interval of distances, the light signal alternatively does not form, through said second optical path, any image on the detection surface, or else forms an image on the basis of which the electronic processing unit is not able to determine a number of maxima of light intensity equal to said first number of light sources.

3. The projective optical metrology system according to claim 2, wherein the electronic processing unit is moreover configured to determine, for each maximum of light intensity determined, corresponding co-ordinates that identify the position of the maximum of light intensity in a reference system fixed with respect to the detection surface, the electronic processing unit being moreover configured to determine said at least one quantity on the basis of the co-ordinates determined.

4. The projective optical metrology system according to claim 3, wherein the light target, the detection surface, and the two optical paths are such that the first and the second intervals of distances are contiguous, one of said first and second intervals of distances being open at one end.

5. The projective optical metrology system according to claim 3, further comprising a first optical circuit and a second optical circuit, the first optical circuit having a first rear principal plane and a first rear effective focal length, and defining said first optical path, the second optical circuit having a second rear principal plane and a second rear effective focal length, and defining said second optical path; and wherein the first and second rear principal planes are set apart from the optoelectronic image sensor, respectively, by a first distance and a second distance, measured, respectively, along the first and second optical paths, the first and second distances being, respectively, a function of the first and second rear effective focal lengths.

6. The projective optical metrology system according to claim 5, wherein the first and second distances are substantially equal, respectively, to the first and second rear effective focal lengths.

7. The projective optical metrology system according to claim 5, wherein said optical unit further comprises a receiving optical element configured to receive the light signal coming from the light target; and wherein said first and second optical paths extend towards the optoelectronic image sensor starting from the receiving optical element.

8. The projective optical metrology system according to claim 7, wherein the first and second optical circuits are moreover configured so as to generate, starting from the light signal received by the receiving optical element, a first optical beam and a second optical beam, and direct towards the optoelectronic image sensor said first and second optical beams, respectively, along the first and second optical paths, in such a way that the first and the second images are, respectively, formed by the first and second optical beams; and wherein the first and second optical circuits are moreover configured so that the first and second optical beams will impinge upon the optoelectronic image sensor in one and the same direction of incidence.

9. The projective optical metrology system according to claim 8, wherein the first optical circuit comprises the receiving optical element and a first optical beam splitter and a second optical beam splitter, the second optical circuit comprising the receiving optical element, the first and second optical beam splitters, and a first reflecting element and a second reflecting element; and wherein the first optical beam splitter is configured so as to split the light signal received by the receiving optical element into the first and second optical beams, the first optical beam splitter being moreover configured to direct the first and second optical beams, respectively, towards the second optical beam splitter and the first reflecting element; and wherein the first and second reflecting elements are configured to receive the second optical beam and directing the second optical beam towards the second optical beam splitter, which is configured to direct both the first optical beam and the second optical beam towards the optoelectronic image sensor, in the direction of incidence.

10. A satellite system comprising a first satellite and a second satellite and a projective optical metrology system according to claim 3, wherein the light target and the optical unit are constrained, respectively, to the first and second satellites; and further comprising an attitude and/or position control system constrained to the second satellite and configured to receive said at least one quantity determined by the electronic processing unit.

11. A projective optical metrology system comprising:
a light target formed by a first number of light sources having a pre-set spatial arrangement;
an optical unit comprising an optoelectronic image sensor comprising a detection surface, the optical unit being configured to receive a light signal coming from said light target and to define two different optical paths for the light signal towards said optoelectronic image sensor; and
an electronic processing unit coupled to the optoelectronic image sensor;
characterized in that the two optical paths are such that the light signal forms on the optoelectronic image sensor at most one image of the light target, which can be processed for determining at least one quantity indicating the mutual arrangement of the light target and of the optical unit; and wherein the two optical paths, the light target and the detection surface are such that:
when the light target is set, from the optical unit, at a distance comprised in a first interval of distances, the light signal forms on the detection surface, through a first optical path of said two optical paths, a first image, on the basis of which the electronic processing unit is able to determine a number of maxima of light intensity equal to said first number;
when the light target is set, from the optical unit, at a distance that falls outside said first interval of distances, the light signal alternatively does not form, through said first optical path, any image on the detection surface, or else forms an image on the basis of which the electronic processing unit is not able to determine a number of maxima of light intensity equal to said first number;
when the light target is set, from the optical unit, at a distance comprised in a second interval of distances, the light signal forms on the detection surface, through a second optical path of said two optical paths, a second image, on the basis of which the electronic processing unit is able to determine a number of maxima of light intensity equal to said first number; and when the light target is set, from the optical unit, at a distance that falls outside said second interval of distances, the light signal alternatively does not form, through said second optical path, any image on the detection surface, or else forms an image on the basis of which the electronic processing unit is not able to determine a number of maxima of light intensity equal to said first number.

* * * * *